No. 706,667. Patented Aug. 12, 1902.
L. R. JONES.
REVERSING GEAR.
Application filed Mar. 20, 1902.
(No Model.)
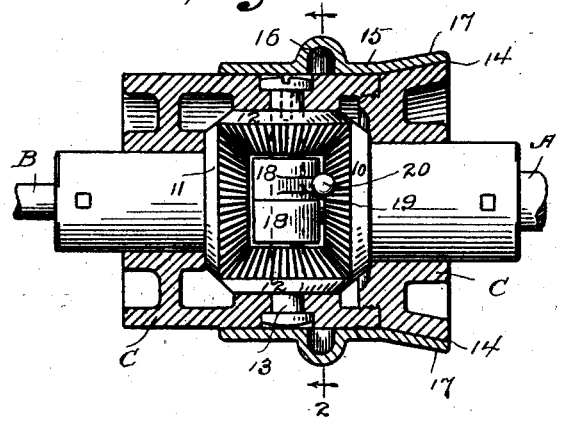
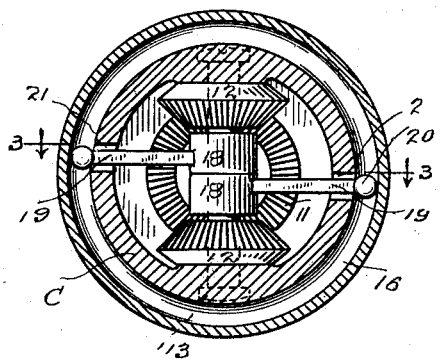
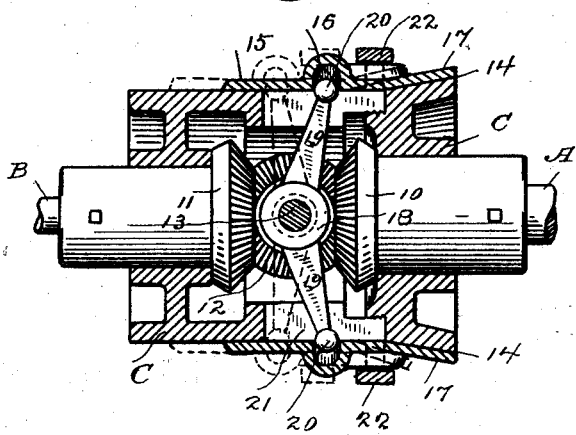
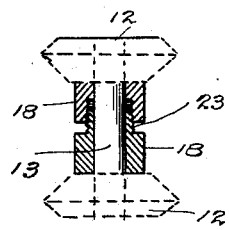
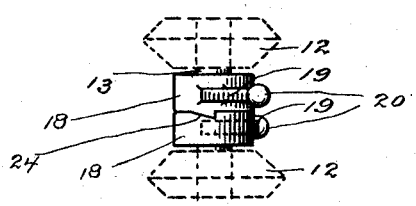
WITNESSES.
H. A. Lamb.
S. W. Atherton
INVENTOR.
Lyman R. Jones
By A. M. Wooster
Atty.

UNITED STATES PATENT OFFICE.

LYMAN R. JONES, OF COSCOB, CONNECTICUT, ASSIGNOR TO CHARLES A. FREEMAN, OF SOUTH NORWALK, CONNECTICUT.

REVERSING-GEAR.

SPECIFICATION forming part of Letters Patent No. 706,667, dated August 12, 1902.

Application filed March 20, 1902. Serial No. 99,128. (No model.)

*To all whom it may concern:*

Be it known that I, LYMAN R. JONES, a citizen of the United States, residing at Coscob, county of Fairfield, State of Connecticut, have invented a new and useful Reversing-Gear, of which the following is a specification.

My invention has for its object to provide a reversing-gear adapted for general use, and especially adapted as a connection between an engine-shaft and a propeller-shaft in a launch or other power-driven vessel, my novel reversing-gear enabling me, with an engine-shaft adapted to rotate in one direction only, to drive the propeller forward, to reverse it, or to disconnect it from the engine-shaft without stopping the rotation of the latter, thus enabling a yachtsman in making a landing with a launch or other power-driven vessel to retain the most perfect control of the driving mechanism and to stop or "tie up," if he cares to, without stopping the engine, a slight movement of a lever or other controlling part being all that is required to disconnect the propeller from the engine-shaft and a slight additional movement to reverse the propeller at any time and without the slightest danger of breaking or straining any of the parts no matter how quickly or how frequently the shifting movement is made. With these ends in view I have devised the novel reversing-gear which I will now describe, referring to the accompanying drawings, forming part of this specification, and using reference characters to designate the several parts.

Figure 1 is a longitudinal section of the casing and operating-sleeve of my novel reversing mechanism, the shafts and gears appearing in elevation; Fig. 2, a transverse section on the line 2 2 in Fig. 1; Fig. 3, a longitudinal section on the line 3 3 in Fig. 2; and Figs. 4 and 5 are detail views illustrating variant forms of connecting-sleeves, Fig. 4 showing said sleeves in the locking position, and Fig. 5 showing them in the disengaged position.

A and B denote two shafts lying in line with each other, their ends being contiguous, either of which may be the engine-shaft or the propeller-shaft. In the present instance let A represent the engine or driving shaft, and B the propeller or driven shaft. At the end of shaft A is a bevel-gear 10 and at the contiguous end of shaft B a bevel-gear 11.

12 denotes bevel-gears mounted to turn on a transverse shaft 13, both of which mesh with bevel-gears 10 and 11. Shaft 13 lies in a rotary casing C, shown as made in two parts and connected together by a screw-thread for convenience in assembling. One end of this casing tapers outward slightly, forming a circumferential incline, as at 14.

15 denotes a non-rotary longitudinally-movable operating-sleeve which incloses a portion of the casing and is provided with an internal circumferential groove 16 and one end of which tapers outward to correspond with incline 14 on the casing, as at 17.

18 denotes connecting-sleeves on transverse shaft 14, each of which is provided with an arm 19, whose outer end engages in the circumferential groove 16, the arms being shown as provided with heads 20 for engagement with the wall of the groove. Slots 21 are provided in the casing, in which the arms are adapted to move freely.

22 denotes a yoke, the arms of which are pivoted to the operating-sleeve and which enables the operator to conveniently move the operating-sleeve longitudinally on the casing, as will be more fully explained. This yoke is of course pivoted on some fixed portion of the framework (not shown) and may be operated by means of a lever (not shown) or in any suitable manner. The connecting-sleeves are so constructed that when they are oscillated on shaft 13 through the engagement of arms 19 with the longitudinally-movable operating-sleeve they will be moved toward or from each other, as shown in Figs. 4 and 5, their outward movement, as indicated in Fig. 4, acting to lock bevel gear-wheels 12 against rotation on the shaft. This longitudinal movement of said sleeves may be effected in any simple and convenient manner. For example, they may be provided with corresponding male and female threads, as at 23 in Fig. 4, or with corresponding cam and incline 24, as in Fig. 5.

The operation is as follows: In the drawings the parts are shown in position for reverse movement. Operating-sleeve 15 is shown as moved forward until its tapering end 17 engages incline 14 on the casing and locks the casing to the sleeve, so that the casing is held against rotation by the non-rotating sleeve. Rotation of shaft A therefore through bevel-gears 12, which are now loose on shaft 13, will act to drive shaft B, which carries the propeller, in the reverse direction. To drive the propeller forward, the operator, by means of yoke 22, moves operating-sleeve 15 from the position shown in full lines in Fig. 3 to the position indicated by dotted lines in said figure. The effect of this movement, through the engagement of arms 19 with groove 16 in the operating-sleeve, will be to oscillate connecting-sleeves 18 on shaft 13, separating said sleeves, as clearly indicated in Figs. 4 and 5, and forcing the outer ends of said sleeves against the inner faces of bevel gear-wheels 12, thereby locking said bevel gear-wheels against rotation, and thus locking shafts A and B together. The movement of shaft A will now be communicated through transverse shaft 13 to operating-sleeve 15, and said sleeve and all parts carried thereby, including, of course, shaft B and the propeller, will be carried forward. Suppose now that it is desired to disconnect the propeller from shaft A, so that the propeller will not rotate, but without stopping the engine. The operator, by means of yoke 22, moves operating-sleeve 15 to a position intermediate the position shown in full lines and the position indicated by dotted lines in Fig. 3. The effect of this movement will be to disengage connecting-sleeves 18 from the inner faces of bevel-gears 12, but without causing an engagement of operating-sleeve 15 with incline 14 on the casing, so that bevel-gears 12 will be rotated by bevel-gear 10 on shaft A, and owing to the resistance of the water on the propeller casing C will be rotated, but bevel-gears 12 will travel on bevel-gear 11, leaving said bevel-gear and shaft B, and with it, of course, the propeller, stationary. From this position a movement of yoke 22 to the position shown in full lines in Fig. 3 will connect operating-sleeve 15 with the casing and will reverse shaft B and the propeller in the manner already described, and a movement of yoke 22 in the opposite direction—that is, to the position indicated by dotted lines in Fig. 3—will disconnect operating-sleeve 15 and the casing and will cause connecting-sleeves 18 to move endwise on shaft 13 and by locking bevel-gears 12 against rotation on said shaft will lock shafts A and B and the casing together, so that the propeller will be driven forward, as already explained.

Having thus described my invention, I claim—

1. A reversing-gear comprising two shafts in line with each other and having bevel-gears at their contiguous ends, a rotary casing, bevel-gears carried by said casing and engaging the bevel-gears on the shafts, an operating-sleeve longitudinally movable on the casing and adapted to engage the casing and means intermediate said sleeve and the bevel-gears carried by the casing, whereby said bevel-gears may be locked against rotation and the shafts and casing will be locked together.

2. A reversing-gear comprising two shafts in line with each other and having bevel-gears at their contiguous ends, a rotary casing, a transverse shaft in said casing, bevel-gears on said shaft engaging the gears on the shafts in line with each other, an operating-sleeve longitudinally movable on the casing and adapted to engage the casing and means intermediate said sleeve and the bevel-gears on the transverse shaft, whereby the latter may be locked against rotation, so that without stopping the rotation of the driving-shaft the driven shaft may be driven in either direction or disconnected from the driving-shaft.

3. A reversing-gear comprising two shafts in line with each other and having bevel-gears at their contiguous ends, a rotary casing having an incline, bevel-gears carried by said casing and engaging the bevel-gears upon the shafts, an operating-sleeve longitudinally movable on the casing and adapted to engage the incline to lock the casing against rotation, and means intermediate said sleeve and the bevel-gears carried by the casing, whereby the bevel-gears may be locked against rotation.

4. A reversing-gear comprising two shafts in line with each other and having bevel-gears at their contiguous ends, a rotary casing, a transverse shaft in said casing, bevel-gears on said shaft engaging the gears on the other shafts, an operating-sleeve longitudinally movable on the casing and adapted to engage the casing and having an internal groove, connecting-sleeves 18 on the transverse shaft having arms engaging said groove and means whereby when said sleeves are oscillated they will be moved toward or from each other to lock or release the bevel-gears on the transverse shaft.

5. A reversing-gear comprising two shafts in line with each other and having bevel-gears at their contiguous ends, a rotary casing, a transverse shaft in said casing, bevel-gears on said shaft engaging the gears on the other shafts, connecting-sleeves on the transverse shaft having arms 19 and provided with means whereby they are moved toward or from each other when oscillated, and a longitudinally-movable operating-sleeve adapted to engage the casing and having an internal groove engaged by the arms, so that the driven shaft may be turned forward, reversed or disconnected without stopping the driving-shaft.

6. A reversing-gear comprising two shafts in line with each other and having bevel-gears at their contiguous ends, a rotary casing having slots 21, a transverse shaft in said casing, gears on said shaft engaging the other gears, connecting-sleeves on the transverse shaft having arms passing through the slots and having heads 20, and a longitudinally-movable operating-sleeve adapted to engage the casing and having an internal groove engaged by heads 20, substantially as shown, for the purpose specified.

7. A reversing-gear comprising two shafts in line with each other and having bevel-gears at their contiguous ends, a rotary casing having an incline, bevel-gears carried by said casing and engaging the other gears, a longitudinally-movable operating-sleeve having a taper adapted to engage the incline and means intermediate the operating-sleeve and the gears carried by the casing, whereby said gears may be locked against rotation.

8. A reversing-gear comprising two shafts in line with each other and having bevel-gears at their contiguous ends, a rotary casing, a transverse shaft in said casing, bevel-gears on said shaft engaging the other gears, connecting-sleeves on the transverse shaft having arms 19, and cams 24, and a longitudinally-movable operating-sleeve adapted to engage the casing and having an internal groove engaged by the arms, said cams acting when the operating-sleeve is moved in one direction to force the connecting-sleeves against the gears on the transverse shaft and lock said gears against rotation, substantially as shown, for the purpose specified.

In testimony whereof I affix my signature in presence of two witnesses.

LYMAN R. JONES. [L. S.]

Witnesses:
R. L. PALMER, [L. S.]
HENRY MORRELL. [L. S.]